S. G. OGLESBY.
AUTOMATIC HEN'S NEST.
APPLICATION FILED FEB. 21, 1913.
1,084,752.
Patented Jan. 20, 1914.
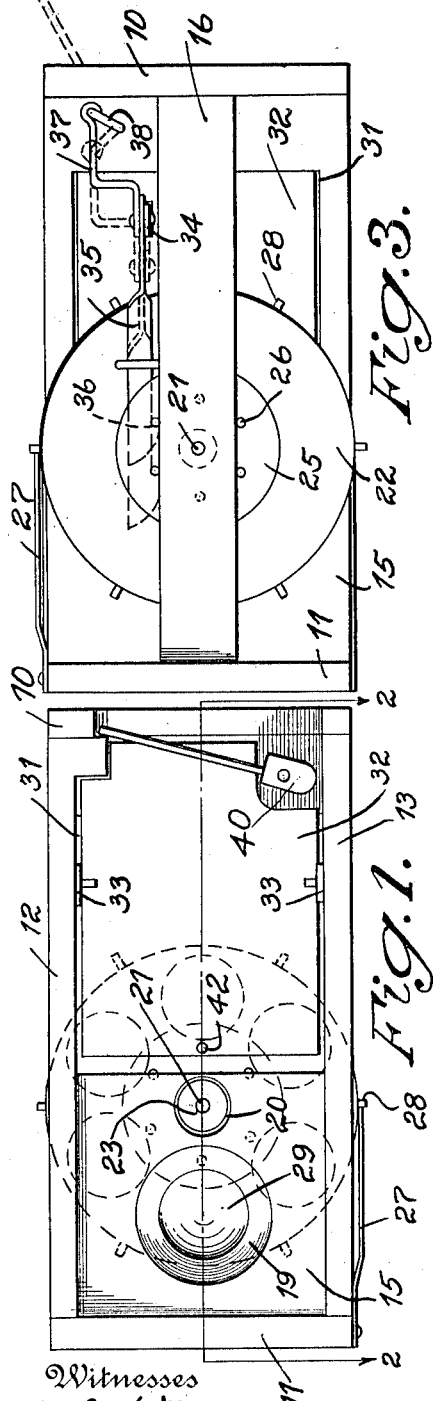
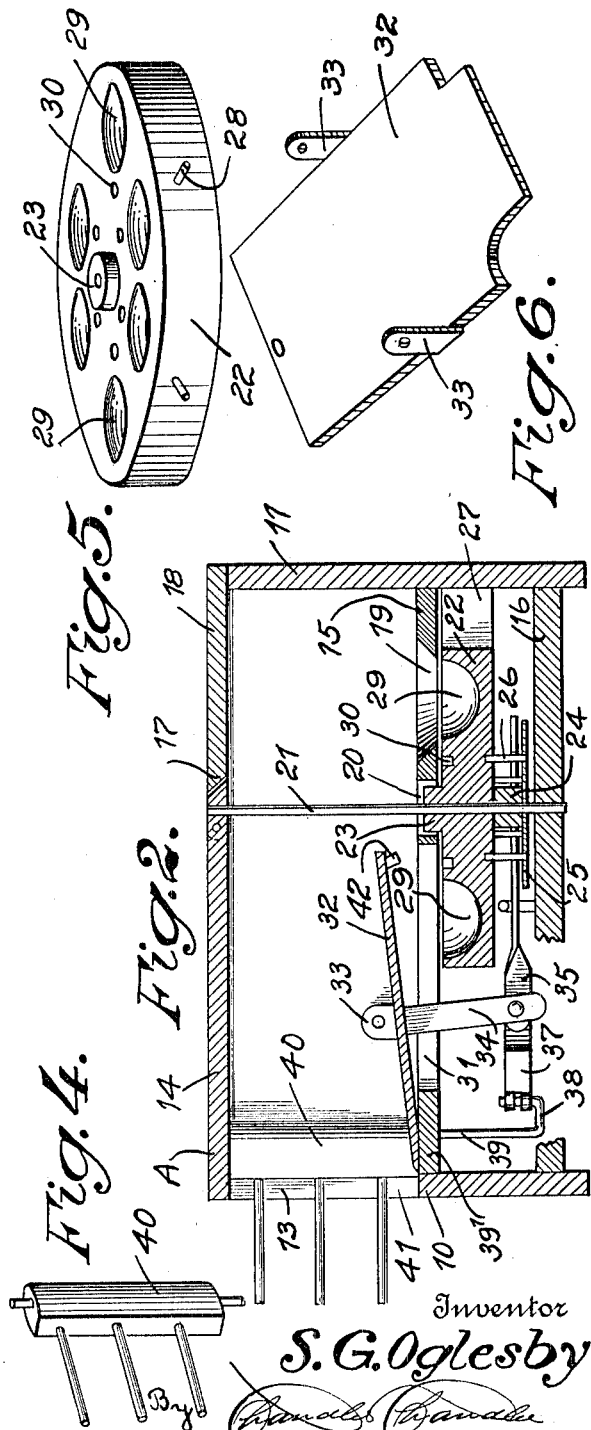
Witnesses
M. S. Watson
Henry T. Bright
Inventor
S. G. Oglesby
By
Attorneys

UNITED STATES PATENT OFFICE.

SABERT G. OGLESBY, OF GREEN POND, ALABAMA.

AUTOMATIC HEN'S NEST.

1,084,752.  Specification of Letters Patent.  Patented Jan. 20, 1914.

Application filed February 21, 1913. Serial No. 749,959.

*To all whom it may concern:*

Be it known that I, SABERT G. OGLESBY, a citizen of the United States, residing at Green Pond, in the county of Bibb, State of Alabama, have invented certain new and useful Improvements in Automatic Hens' Nests; and I do hereby declare the following to be a full, clear, and exact description of the invention, such as will enable others skilled in the art to which it appertains to make and use the same.

This invention relates to hen nests.

The object of the invention resides in the provision of a hen's nest which will enable the laying capacity of each individual hen to be accurately checked, the mechanical operation of said nest being effected by the entrance and exit of each hen.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 a plan view of the device with top removed and the parts in the position they occupy when a hen is within the nest. Fig. 2, a section on the line 2—2 of Fig. 1 with the parts in the position they would occupy when the hen has left the nest. Fig. 3, a bottom view of the nest showing the parts in full lines in the position shown in Fig. 1 and in dotted lines in the position shown in Fig. 2; Fig. 4, a detail perspective view of the automatic door; Fig. 5, a detail perspective view of the nest disk, and Fig. 6, a detail perspective view of the pivoted platform.

Referring to the drawings the nest is shown as comprising a casing A which includes front and rear members 10 and 11, side members 12 and 13, a top 14 and a bottom 15. The front and rear members 10 and 11 are extended at their lower ends to form legs which support the casing A in elevation. The extended ends of the front and rear members 10 and 11 are connected by a longitudinal beam 16 for a purpose that will presently appear. The top member 14 terminates short of the rear member 11 to form an opening 17, which is adapted to be closed by a door 18 suitably hinged to the member 14. The bottom member 15 is provided with an opening 19 disposed adjacent the rear end thereof and constituting a portion of each individual nest as will hereinafter appear. The bottom 15 is further provided with an opening 20 just forward of the opening 19 and for a purpose that will presently appear. Extending through the opening 20 and having its ends journaled in the top member 14 and the beam 16 is a vertical shaft 21 upon which is fixed between the bottom member 15 and the beam 16 a nest disk 22. This nest disk 22 is provided on its upper side with a central extension 23 disposed in the opening 20 and on its lower side with a central extension 24. Disposed against the outer end of the extension 24 is a relatively thin disk 25 which is connected to the nest disk 22 by a plurality of pins 26 arranged concentric with respect to the shaft 21 for a purpose that will presently appear. Mounted on the rear member 11 is a spring pawl 27 the free end of which bears against the periphery of the nest disk 22. The periphery of this nest disk 22 has mounted therein at suitable spaced intervals stops 28 with which the pawl 27 is adapted to coöperate to lock the disk 22 against rotation in one direction. The upper side of the disk 22 is provided with a plurality of dished recesses 29 arranged concentric with the shaft 21 and adapted during the rotation of the disk 22 to pass successively beneath the opening 19 in the bottom member 15. The disk 22 is further provided on its upper side with a plurality of small recesses 30 disposed inwardly of the recesses 29 and concentric with respect to the shaft 21. The bottom member 15 terminates a considerable distance short of the forward end of the casing A so as to form an opening 31. This opening 31 is closed by a platform 32 which is provided at each side with an ear 33 which are pivotally connected to the adjacent side members 12 and 13.

Depending from the platform 32 is an arm 34 which has secured to its free end at right angles thereto an arm 35. The rear end of this arm 35 is provided with a notch 36 adapted to receive respective pins 26 under conditions that will hereinafter appear. The forward end of the arm 35 is offset as at 37 and is pivotally connected with the crank portion 38 at the lower end of a vertical shaft 39 which is journaled in a cross member 39' and the top member 14. Fixed on this shaft 39 and movable therewith is a door 40 adapted to close the opening 41 in the front member 10 of the casing. Depending from the inner end of the platform 32 is a pin 42 which when the inner end of the platform is depressed is adapted to engage in one of the recesses 30 to positively stop rotation of the disk 22 under the influence of the depression of the inner end of the platform.

When the outer end of the platform 32 is depressed the door 40 is open and one of the pins 26 is engaged in the notch 36 of the arm 35. When the parts are in this position and a hen enters the nest the weight of the hen will depress the inner end of the platform 32 and cause the free end of the arm 34 to swing forwardly which will in turn effect a longitudinal forward movement of the arm 35 and as one of the pins 26 is engaged in the notch 36 it will be apparent that the disk 22 will be rotated to dispose the next recess 29 beneath the opening 19. At the termination of the downward movement of the inner end of the platform 32 the pin 42 will engage in one of the recesses 30 and lock the disk 22 against continued rotation under the influence of its momentum. The forward movement of the arm 35 will also rotate the shaft 39 to close the door 40 and thereby prevent the entrance of other hens to the nest. As the hen leaves the nest the forward end of the platform 32 will be depressed and result in the door 40 being opened and the other parts of the device with the exception of the disk 22 returned to their initial position.

To identify the eggs deposited in the recesses 29 it is customary to attach different colored crayon to the limbs of the hens respectively and the particular color crayon transferred to the wall of the dished recess 29 during laying will serve to identify by which hen the egg in the particular recess was laid.

What I claim is:—

In a hen nest the combination of a casing having an opening in its bottom and an opening in its front, a vertical shaft journaled in the casing, a door fixed on said shaft for controlling the opening at the front of the casing, a crank portion on the lower end of said vertical shaft, a disk rotatably mounted beneath the bottom of the casing and provided with a plurality of recesses adapted to successively register with the opening in the bottom as the disk is rotated, a plurality of pins depending from the disk and arranged concentrically with respect to the latter, a centrally pivoted platform disposed within the casing, an arm depending from said platform whereby the depression of the ends thereof will oscillate said arm, connections between said arm and the crank portion of said vertical shaft whereby the depression of opposite ends of the platform will rotate said shaft to open and close the door, a trip arm secured to said depending arm movable longitudinally under the influence of the oscillation of said depending arm, a shoulder formed on the inner end of said trip arm and engaged with one of said pins when the trip arm is in its rearmost position whereby the forward longitudinal movement of said trip arm will rotate the disk to dispose the nest recess thereof in registration with the opening in the bottom of the casing.

In testimony whereof, I affix my signature, in the presence of two witnesses.

SABERT G. OGLESBY.

Witnesses:
M. B. SHACKELFORD,
N. M. ELLIS.

Copies of this patent may be obtained for five cents each, by addressing the "Commissioner of Patents, Washington, D. C."